United States Patent
Hammad et al.

(10) Patent No.: US 11,352,302 B2
(45) Date of Patent: Jun. 7, 2022

(54) METHODS OF HOLISTICALLY DIFFUSING CARBON DIOXIDE WITHIN A CONCRETE MIXTURE

(71) Applicant: Saudi Arabian Oil Company, Dhahran (SA)

(72) Inventors: Ahmad D. Hammad, Dhahran (SA); Ali Shakir Al Hunaidy, Dhahran (SA); Bandar A. Fadhel, Dhahran (SA); Issam T. Amr, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 229 days.

(21) Appl. No.: 16/626,617

(22) PCT Filed: Nov. 27, 2019

(86) PCT No.: PCT/GR2019/000083
§ 371 (c)(1),
(2) Date: Dec. 26, 2019

(87) PCT Pub. No.: WO2021/105726
PCT Pub. Date: Jun. 3, 2021

(65) Prior Publication Data
US 2021/0284585 A1   Sep. 16, 2021

(51) Int. Cl.
*C04B 40/06* (2006.01)
*C04B 14/14* (2006.01)
*C04B 28/02* (2006.01)
*C04B 40/00* (2006.01)
*C04B 40/02* (2006.01)

(52) U.S. Cl.
CPC .......... *C04B 40/0608* (2013.01); *C04B 14/14* (2013.01); *C04B 28/02* (2013.01); *C04B 40/0042* (2013.01); *C04B 40/0231* (2013.01)

(58) Field of Classification Search
CPC ..... C04B 14/14; C04B 14/043; C04B 14/047; C04B 14/106; C04B 14/108; C04B 14/16; C04B 18/08; C04B 18/101; C04B 18/141; C04B 18/142; C04B 20/1055; C04B 20/1011; C04B 20/02; C04B 20/1066; C04B 22/10; C04B 28/02; C04B 40/0042; C04B 40/0231; C04B 40/0608; C04B 40/0675; B28C 7/0007; Y02W 30/91
See application file for complete search history.

(56) References Cited

U.S. PATENT DOCUMENTS

| | | | |
|---|---|---|---|
| 5,624,493 A | 4/1997 | Wagh et al. |
| 8,845,940 B2 | 9/2014 | Niven et al. |
| 9,376,345 B2 | 6/2016 | Forgeron et al. |
| 2014/0216303 A1 | 8/2014 | Lee et al. |
| 2016/0280598 A1 | 9/2016 | Wang et al. |

FOREIGN PATENT DOCUMENTS

| | | |
|---|---|---|
| JP | 05254910 A | 10/1993 |
| WO | 2014160168 A1 | 10/2014 |

OTHER PUBLICATIONS

International Search Report and Written Opinion dated Jul. 17, 2020 pertaining to International application No. PCT/GR2019/000083 filed Nov. 27, 2019, 11 pgs.

*Primary Examiner* — Anthony J Green
(74) *Attorney, Agent, or Firm* — Dinsmore & Shohl LLP (57) ABSTRACT

A method of diffusing $CO_2$ within a concrete mixture that includes mixing a non-recycled aggregate material with a $CO_2$ gas in a pretreatment chamber of a concrete preparation system to form a $CO_2$ adsorbed aggregate material, transferring the $CO_2$ adsorbed aggregate material from the pretreatment chamber into a cement mixing chamber of the concrete preparation system, and mixing the $CO_2$ adsorbed aggregate material with cement and water to form the concrete mixture, where mixing the $CO_2$ adsorbed aggregate material with cement and water releases $CO_2$ from the $CO_2$ adsorbed aggregate material and diffuses $CO_2$ into the concrete mixture to form a carbonated concrete mixture.

19 Claims, 4 Drawing Sheets

METHODS OF HOLISTICALLY DIFFUSING CARBON DIOXIDE WITHIN A CONCRETE MIXTURE

BACKGROUND

Field

The present specification generally relates to methods for diffusing carbon dioxide ($CO_2$) within a concrete mixture. More specifically, the present disclosure relates to methods for diffusing $CO_2$ within a concrete mixture using a $CO_2$ adsorbed aggregate material.

Technical Background

Concrete curing is one of the process steps when producing hardened concrete products, such as precast structures or bricks from slurry concrete. Steam or water are the typical curing agents used to cure concrete mixtures, however, $CO_2$ gas is increasingly being used as an alternative curing agent. Using $CO_2$ gas as a curing agent helps to produce hardened concrete products having increased mechanical strength, higher $CO_2$ uptake for permanent sequestration, and expedited production time. These advantages are proportional to the penetration level of $CO_2$ within the concrete mixture, however current techniques suffer from limited $CO_2$ penetration due to the limited gas-solid contact area between the $CO_2$ and the concrete mixture.

Accordingly, there is a desire for systems and methods of carbonating concrete mixtures with increased $CO_2$ penetration that is uniformly distributed throughout the concrete mixture.

SUMMARY

According to an embodiment of the present disclosure, a method of diffusing $CO_2$ within a concrete mixture includes mixing a non-recycled aggregate material with a $CO_2$ gas in a pretreatment chamber of a concrete preparation system to form a $CO_2$ adsorbed aggregate material, transferring the $CO_2$ adsorbed aggregate material from the pretreatment chamber into a cement mixing chamber of the concrete preparation system, and mixing the $CO_2$ adsorbed aggregate material with cement and water to form the concrete mixture, where mixing the $CO_2$ adsorbed aggregate material with cement and water releases $CO_2$ from the $CO_2$ adsorbed aggregate material and diffuses $CO_2$ into the concrete mixture to form a carbonated concrete mixture.

According to another embodiment of the present disclosure, a method of diffusing $CO_2$ within a concrete mixture includes mixing a non-recycled aggregate material that is a pozzolan material with a $CO_2$ gas in a pretreatment chamber of a concrete preparation system to form a $CO_2$ adsorbed aggregate material, transferring the $CO_2$ adsorbed aggregate material from the pretreatment chamber into a cement mixing chamber of the concrete preparation system through a chamber connection pipe, and mixing the $CO_2$ adsorbed aggregate material with cement and water to form the concrete mixture, where mixing the $CO_2$ adsorbed aggregate material with cement and water releases $CO_2$ from the $CO_2$ adsorbed aggregate material and diffuses $CO_2$ into the concrete mixture to form a carbonated concrete mixture having a distribution of carbon that varies by 10% or less throughout the volume of the carbonated concrete mixture.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Reference will now be made in detail to methods of diffusing $CO_2$ within a concrete mixture using a $CO_2$ adsorbed aggregate material to accelerate carbonation of the concrete mixture. The method uses a concrete preparation system comprising a pretreatment chamber and a cement mixing chamber. The method includes mixing a non-recycled aggregate material, such as a pozzolan material, with $CO_2$ gas in a pretreatment chamber, where the $CO_2$ gas is adsorbed by the non-recycled aggregate material. Next, the $CO_2$ adsorbed aggregate material is transferred from the pretreatment chamber into a cement mixing chamber, where it is mixed with cement and water to form a concrete mixture. During the mixing step, $CO_2$ is released by the $CO_2$ adsorbed aggregate material to uniformly carbonate the concrete mixture. Embodiments of the method of diffusing $CO_2$ within a concrete mixture and the concrete preparation system will now be described and, whenever possible, the same reference numerals will be used throughout the drawings to refer to the same or like parts.

Figure 1:
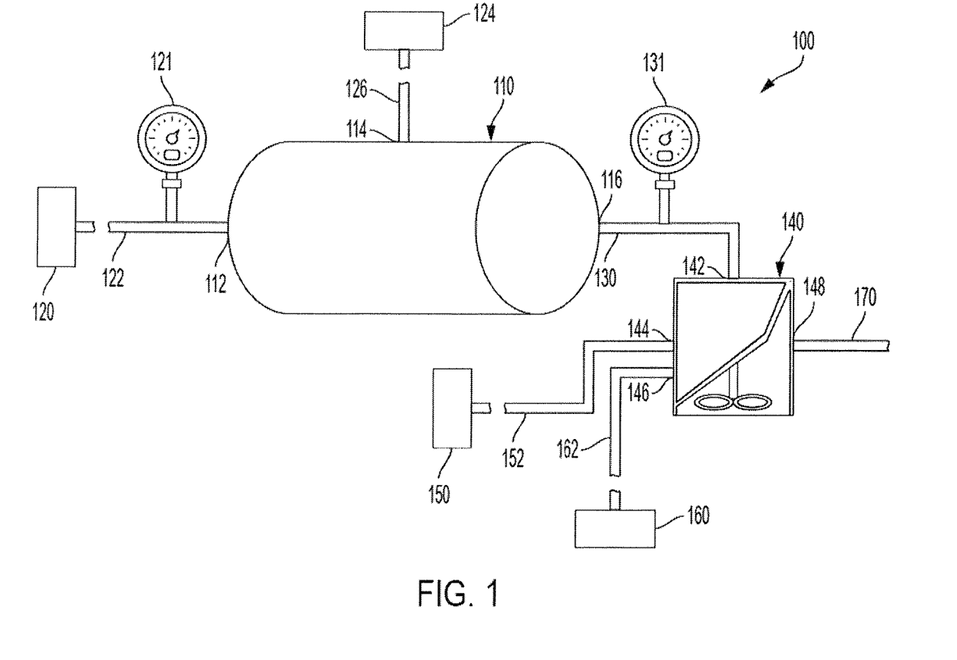
FIG. 1 schematically depicts a concrete preparation system having a pretreatment chamber and a cement mixing chamber, according to one or more embodiments shown and described herein.

Referring now to FIG. 1, a concrete preparation system 100 comprising a pretreatment chamber 110 and a cement mixing chamber 140 is schematically depicted. The pretreatment chamber 110 provides a chamber for mixing a non-recycled aggregate material with $CO_2$ gas to form a $CO_2$ adsorbed aggregate material. The cement mixing chamber 140 provides a chamber for mixing the $CO_2$ adsorbed aggregate material formed in the pretreatment chamber 110 with cement and water to form a concrete mixture and, in particular, to form a carbonated concrete mixture. The pretreatment chamber 110 is coupled to the cement mixing chamber 140 by a chamber connection pipe 130 such that $CO_2$ adsorbed aggregate material formed in the pretreatment chamber 110 may be supplied to the cement mixing chamber 140. The chamber connection pipe 130 is coupled to a mixture outlet 116 of the pretreatment chamber 110 and a mixture inlet 142 of the cement mixing chamber 140. The cement mixing chamber 140 further comprises a concrete outlet 148, which may be connected to a concrete output pipe 170 for outputting the carbonated concrete mixture from the cement mixing chamber 140.

The pretreatment chamber 110 comprises a $CO_2$ inlet 112 for receiving $CO_2$ gas and an aggregate inlet 114 for receiving non-recycled aggregate material. The concrete preparation system 100 may further comprise a $CO_2$ source 120 and a $CO_2$ input pipe 122 extending between the $CO_2$ source 120 and the $CO_2$ inlet 112 of the pretreatment chamber 110. In some embodiments, the $CO_2$ source 120 may comprise a flue gas source or a $CO_2$ container. In operation, the $CO_2$ source 120 may supply $CO_2$ gas to the pretreatment chamber 110. In addition, an upstream flowmeter 121 may be fluidly coupled to the $CO_2$ input pipe 122. The upstream flowmeter 121 is configured to measure the flow rate of $CO_2$ gas entering the pretreatment chamber 110. Additional flow control components, such as pumps and valves, may also be fluidly coupled to the $CO_2$ input pipe 122 to increase or decrease the flow rate of $CO_2$ gas traveling through the $CO_2$ input pipe 122 and entering the pretreatment chamber 110. The $CO_2$ source 120 itself may also provide flow control.

The concrete preparation system 100 may further comprise an aggregate source 124 and an aggregate input pipe 126 extending between aggregate source 124 and the aggregate inlet 114 of the pretreatment chamber 110. In operation, the aggregate source 124 may supply non-recycled aggregate material to the pretreatment chamber 110. However, it should be understood that in some embodiments, non-recycled aggregate material is directly supplied into the pretreatment chamber 110 using the aggregate inlet 114 and this embodiment may not include the aggregate input pipe 126 and the aggregate source 124.

In operation, once non-recycled aggregate material and $CO_2$ gas are mixed in the pretreatment chamber 110 to form the $CO_2$ adsorbed aggregate material, the $CO_2$ adsorbed aggregate material is transferred from the pretreatment chamber 110 into the cement mixing chamber 140 through the chamber connection pipe 130. In addition, a downstream flowmeter 131 may be coupled to the chamber connection pipe 130. The downstream flowmeter 131 is configured to measure the flow rate of $CO_2$ adsorbed aggregate material traveling through the chamber connection pipe 130 and entering the cement mixing chamber 140. Additional flow control components, such as pumps and valves, may also be coupled to the chamber connection pipe 130 to increase or decrease the flow rate of $CO_2$ adsorbed aggregate material entering the cement mixing chamber 140.

As depicted in FIG. 1, the concrete preparation system 100 further comprises a cement source 150 and a water source 160, each coupled to the cement mixing chamber 140. The cement source 150 is coupled to the cement mixing chamber 140 by a cement input pipe 152 and the water source 160 is coupled to the cement mixing chamber 140 by a water input pipe 162. In particular, the cement input pipe 152 is coupled to a cement inlet 144 of the cement mixing chamber 140 and the water input pipe 162 is coupled to a water inlet 146 of the cement mixing chamber 140. In operation, the cement source 150 may supply cement to the cement mixing chamber 140 and the water source 160 may supply water to the cement mixing chamber 140. In addition, the $CO_2$ adsorbed aggregate material may enter the cement mixing chamber 140 through the mixture inlet 142.

Referring still to FIG. 1, a method of diffusing $CO_2$ within the concrete mixture using the concrete preparation system 100 first includes mixing the non-recycled aggregate material with $CO_2$ gas in the pretreatment chamber 110 to form a $CO_2$ adsorbed aggregate material. In particular, mixing the non-recycled aggregate material with the $CO_2$ gas in the pretreatment chamber 110 includes directing the non-recycled aggregate material into the pretreatment chamber 110 and directing the $CO_2$ gas from the $CO_2$ source 120 into the pretreatment chamber 110. The non-recycled aggregate material may be directed into the pretreatment chamber 110 in batches, such that the $CO_2$ gas may be evenly distributed throughout a controlled amount of non-recycled aggregate material to control the amount of $CO_2$ adsorbed in the $CO_2$ adsorbed aggregate material and increase the uniformity of $CO_2$ distribution within the $CO_2$ adsorbed aggregate material.

The $CO_2$ gas is directed from the $CO_2$ source 120 into the pretreatment chamber 110 at a flow rate of from 300 ml/min to 1400 ml/min, such as, from 400 ml/min to 1200 ml/min, 500 ml/min to 1000 ml/min, or the like, for example, 350 ml/min, 400 ml/min, 450 ml/min, 500 ml/min, 550 ml/min, 600 ml/min, 650 ml/min, 700 ml/min, 750 ml/min, 800 ml/min, 850 ml/min, 900 ml/min, 950 ml/min, 1000 ml/min, 1050 ml/min, 1100 ml/min, 1150 ml/min, 1200 ml/min, 1250 ml/min, 1300 ml/min, 1350 ml/min, or the like. Mixing the non-recycled aggregate material with the $CO_2$ gas in the pretreatment chamber 110 may further comprises agitating the non-recycled aggregate material in the pretreatment chamber 110, for example, by rotating the pretreatment chamber 110, shaking the pretreatment chamber 110, stirring the non-recycled aggregate material using a mixing device located in the pretreatment chamber 110, or a combination of two or more of these agitation techniques.

Next, the method comprises transferring the $CO_2$ adsorbed aggregate material from the pretreatment chamber 110 into the cement mixing chamber 140 and mixing the $CO_2$ adsorbed aggregate material with cement and water, for example, by directing cement from the cement source 150 into the cement mixing chamber 140 and directing water from the water source 160 into the cement mixing chamber 145. Mixing the $CO_2$ adsorbed aggregate material with water and cement forms a concrete mixture, which may be a concrete paste, and generates heat. In some embodiments, mixing the $CO_2$ adsorbed aggregate material with water and cement in the cement mixing chamber 140 may further comprise agitating the $CO_2$ adsorbed aggregate material, water, and cement in the cement mixing chamber 140, for example, by rotating the cement mixing chamber 140, shaking the cement mixing chamber 140, stirring the $CO_2$ adsorbed aggregate material, water, and cement using a mixing device located in the cement mixing chamber 140, or a combination of two or more of these agitation techniques.

The heat and the agitation that occur when mixing in the cement mixing chamber 140 releases $CO_2$ from the $CO_2$ adsorbed aggregate material, which mixes with and carbonates the concrete mixture, forming a carbonated concrete mixture. While not intending to be limited by theory, during the mixing step, the concrete mixture reaches a temperature of from 30° C. to 60° C., such as from 40° C. to 60° C. Because the concrete mixture is carbonated by releasing $CO_2$ from the $CO_2$ adsorbed aggregate material, the $CO_2$ diffuses through the carbonated concrete mixture uniformly. For example, in some embodiments, the carbonated concrete mixture comprises a distribution of carbon that varies by 25% or less throughout the volume of the carbonated concrete mixture, for example, by 20% or less, 15% or less, 10% or less, 5% or less, or the like.

Figure 2A:
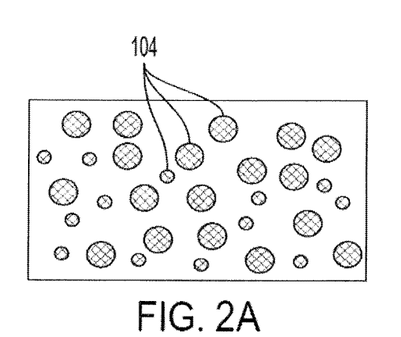
FIG. 2A schematically depicts a concrete mixture that includes a non-recycled aggregate material, according to one or more embodiments shown and described herein.
Figure 2B:
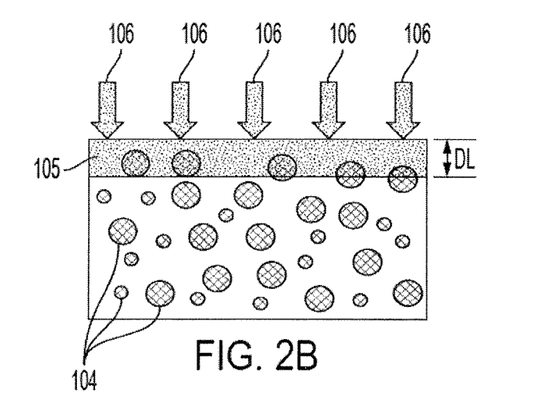
FIG. 2B schematically depicts carbonation curing of the concrete mixture of FIG. 2A, after surface introduction of $CO_2$ gas to the concrete mixture, according to one or more embodiments shown and described herein.

Referring now to FIGS. 2A and 2B, previous carbonation techniques suffered the lack of holistic penetration and distribution of $CO_2$ within a concrete mixture. For example, FIG. 2A schematically depicts a non-recycled aggregate material 104 that is not premixed with $CO_2$ and thus is not a $CO_2$ adsorbed aggregate material. Instead, as shown in FIG. 2B, $CO_2$ gas 106 is directed into a surface of a concrete mixture (formed from this non-$CO_2$ adsorbed aggregate material, cement, and water) such that $CO_2$ only penetrates into a portion of the concrete mixture to form a $CO_2$ penetration zone 105 having a layer depth DL.

Figure 2C:
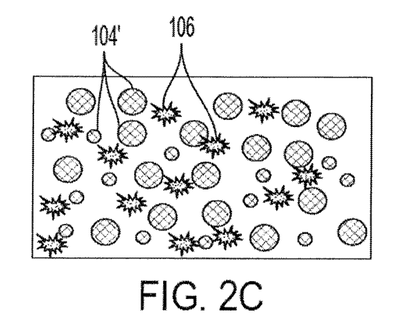
FIG. 2C schematically depicts another concrete mixture that includes a non-recycled aggregate material premixed with $CO_2$ gas, according to one or more embodiments shown and described herein.
Figure 2D:
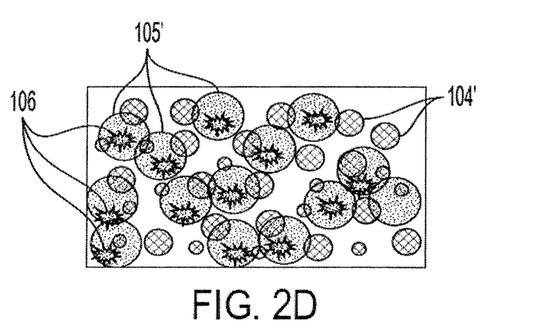
FIG. 2D schematically depicts carbonation curing of the concrete mixture of FIG. 2C, according to one or more embodiments shown and described herein.

Referring now to FIGS. 2C and 2D, the techniques described herein increase the uniformity of $CO_2$ diffusion throughout the concrete mixture. For example, FIG. 2C depicts a non-recycled aggregate material 104' and $CO_2$ gas 106 during a pretreatment mixing process to form a $CO_2$ adsorbed aggregate material and FIG. 2D depicts the mixing of the $CO_2$ adsorbed aggregate material with cement and water to form a concrete mixture. The mixing step shown in FIG. 2D releases $CO_2$ from the $CO_2$ adsorbed aggregate material and carbonates the concrete mixture. The carbonated concrete mixture is schematically depicted by a plurality of $CO_2$ penetration zones 105' dispersed throughout the concrete mixture. Moreover, it should be understood that the entirety of the carbonated concrete mixture may be encompassed by $CO_2$ penetration zones 105' and $CO_2$ may be uniformly distributed throughout the carbonated concrete mixture. While not intending to be limited by theory, by uniformly distributing $CO_2$ throughout the carbonated concrete mixture, the carbonated concrete mixture may produce hardened concrete products having increased mechanical strength, higher $CO_2$ uptake for permanent sequestration, and expedited production time when compared to concrete products formed with steam or water as the curing agent and when compared to concrete products formed with a $CO_2$ curing agent that is unevenly distributed throughout the carbonated concrete mixture.

To facilitate the adsorption and release of $CO_2$ and thus facilitate the uniform diffusion of carbon in the concrete mixture, the non-recycled aggregate material comprises an aggregate material that is capable of adsorbing $CO_2$ and releasing adsorbed $CO_2$ into the concrete mixture due to the heat that is generated by the exothermic reactions that occur during cement mixing and curing. In some embodiments, the non-recycled aggregate material comprises a pozzolan material, which is an aggregate material that is capable of adsorbing and releasing $CO_2$. For example, pozzolan materials release adsorbed $CO_2$ at a temperature of 30° C. and thus, with the $CO_2$ adsorbed aggregate material comprises a $CO_2$ adsorbed pozzolan material, the $CO_2$ adsorbed aggregate material releases $CO_2$ at the temperatures reached during mixing of the $CO_2$ adsorbed aggregate material with cement and water in the cement mixing chamber 140 (i.e., a temperature of from 30° C. to 60° C.). The pozzolan material of the non-recycled aggregate material may be a natural pozzolan material, an artificial pozzolan material, or a combination thereof. Example natural pozzolan materials include volcanic ash, pumice, pumicite (such as rhyolitic pumicite), pumice, ignimbrite, expanded shale, zeolite, metakaolin, and natural pozzolan from plant ashes that contain silica, including rice husk ash and date palm tree ash. Example artificial pozzolan materials include fly ash, slag, vitrified calcium alumino-silicate (VCAS), and silica fume.

Figure 3:
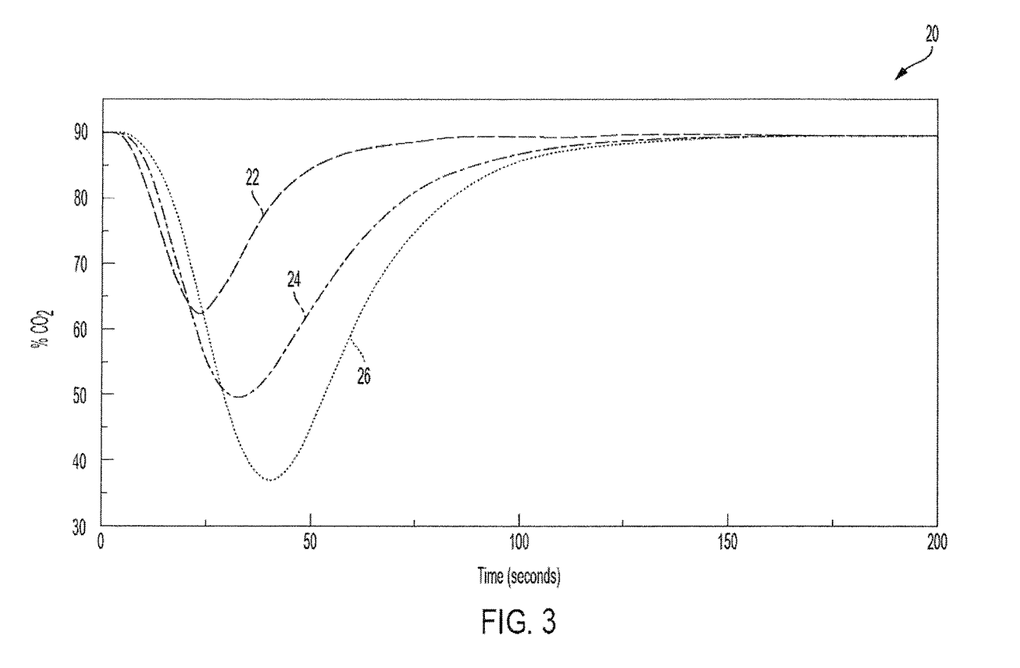
FIG. 3 graphically depicts the adsorption capability of a non-recycled aggregate material comprising pozzolan and two comparative $CO_2$ adsorbing materials, according to one or more embodiments shown and described herein.

Referring now to FIG. 3, a graph 20 depicts the adsorption capability of a non-recycled aggregate material comprising a pozzolan material and two comparative $CO_2$ adsorbing materials. FIG. 3 depicts the percentage of $CO_2$ present in the pretreatment chamber 110 as a function of time during a process in which $CO_2$ gas is directed into the pretreatment chamber 110, which is housing 4.85 grams of a $CO_2$ adsorbing material (i.e., line 22 is a pozzolan material and lines 24 and 26 are two comparative $CO_2$ adsorbing materials), at a flowrate of 300 ml/min and a temperature of 25° C. In particular, line 22 shows the percentage of $CO_2$ present in the pretreatment chamber 110 as a function of time when the $CO_2$ adsorbing material is a pozzolan material (such as the pozzolan material of the non-recycled aggregate material used in the methods described herein), line 24 shows the percentage of $CO_2$ present in the pretreatment chamber 110 as a function of time when the $CO_2$ adsorbing material is a comparative $CO_2$ adsorbing material comprising K-42 activated carbon, and line 26 shows the percentage of $CO_2$ present in the pretreatment chamber 110 as a function of time when the $CO_2$ adsorbing material is a comparative $CO_2$ adsorbing material comprising BAZ-1 activated carbon.

Graph 20 shows that the percentage of $CO_2$ present in the pretreatment chamber 110 initially decreases as the $CO_2$ adsorbing material adsorbs the $CO_2$ gas directed into the pretreatment chamber 110. Once the $CO_2$ adsorbing material reaches its $CO_2$ adsorption capacity, the percentage of $CO_2$ present in the pretreatment chamber 110 begins to increase as additional $CO_2$ gas is directed into the pretreatment chamber 110. In addition, while the pozzolan material does not reduce the percentage of $CO_2$ present in the pretreatment chamber 110 as much as the two comparative $CO_2$ adsorbing materials, these two comparative $CO_2$ adsorbing materials are not aggregate materials. Indeed, lines 22-26 show that the adsorption capability of pozzolan material compares favorably to K-42 and BAZ-1. K-42 activated carbon and BAZ-1 activated carbon are entirely composed of carbon. Pozzolan materials can be composed of some or all of the following components: sodium oxide, magnesium oxide, aluminum oxide, silicon dioxide, phosphorous pentoxide, sulfur trioxide, chlorine, potassium oxide, calcium oxide, titanium dioxide, manganese (II) oxide, and iron (III) oxide. The present inventors have recognized that the silica component of the pozzolan material, which can range from 20-95% of the pozzolan material, may provide for the increased absorption capability of pozzolan material when compared to K-42 and BAZ-1.

Figure 4:
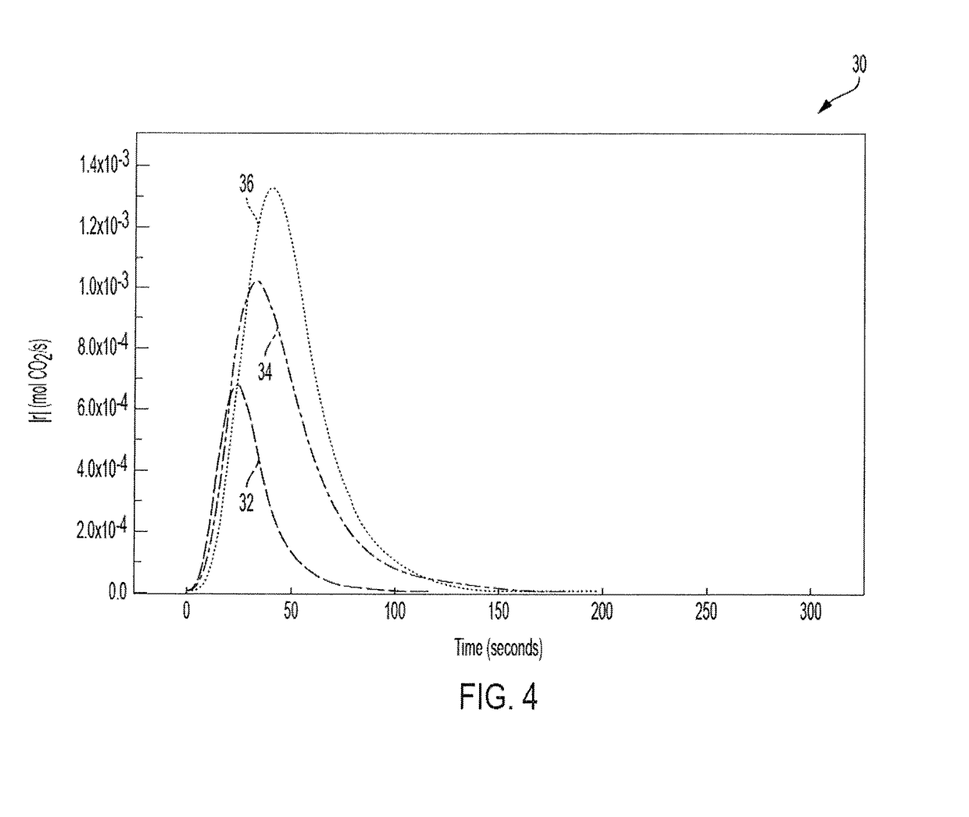
FIG. 4 graphically depicts the adsorption rate of a non-recycled aggregate material comprising pozzolan and two comparative $CO_2$ adsorbing materials, according to one or more embodiments shown and described herein.

Referring now to FIG. 4, a graph 30 depicts the adsorption rate of the non-recycled aggregate material comprising a pozzolan material and the two comparative $CO_2$ adsorbing materials measured in FIG. 3. FIG. 4 depicts the adsorption rate of $CO_2$ in moles of $CO_2$ per second as a function of time during a process in which $CO_2$ gas is directed into the pretreatment chamber 110, which is housing 4.85 grams of a $CO_2$ adsorbing material (i.e., line 32 is a pozzolan material and lines 34 and 36 are two comparative $CO_2$ adsorbing materials), at a flowrate of 300 ml/min and a temperature of 25° C. In particular, line 32 shows the adsorption rate of $CO_2$ as a function of time when the $CO_2$ adsorbing materials is a pozzolan material (such as the pozzolan material of the non-recycled aggregate material used in the methods described herein), line 34 shows the adsorption rate of $CO_2$ when the $CO_2$ adsorbing materials is a comparative $CO_2$ adsorbing material comprising K-42 activated carbon, and line 26 shows the adsorption rate of $CO_2$ as a function of time when the $CO_2$ adsorbing materials is a comparative $CO_2$ adsorbing material comprising BAZ-1 activated carbon.

As shown in FIG. 4, the adsorption rate of each $CO_2$ adsorbing material increases to a peak $CO_2$ adsorption rate then decreases until reaching a $CO_2$ adsorption capacity. Line 32 shows that the pozzolan material comprises a peak $CO_2$ adsorption rate of $6.0 \times 10^{-4}$ moles per second or greater, line 34 shows that comparative $CO_2$ adsorbing material comprising K-42 activated carbon comprises a peak $CO_2$ adsorption rate of $1.0 \times 10^{-3}$ moles per second or greater, and line 36 shows that comparative $CO_2$ adsorbing material comprising BAZ-1 activated carbon comprises a peak $CO_2$ adsorption rate of $1.3 \times 10^{-3}$ moles per second or greater. Furthermore, the pozzolan material depicted by line 32 has a $CO_2$ adsorption capacity of 0.4 millimoles per gram or greater, for example, 0.45 millimoles per gram or greater, the comparative $CO_2$ adsorbing material comprising K-42 activated carbon shown by line 34 has a $CO_2$ adsorption capacity of 0.9 millimoles per gram or greater, for example, 0.97 millimoles per gram or greater, and the comparative $CO_2$ adsorbing material comprising BAZ-1 activated carbon shown by line 36 $CO_2$ adsorption capacity of 1.2 millimoles per gram or greater, for example, 1.23 millimoles per gram or greater. While the pozzolan material does not have as high of a peak $CO_2$ adsorption rate or a $CO_2$ adsorption capacity as the two comparative $CO_2$ adsorbing materials, these two comparative $CO_2$ adsorbing materials are not aggregate materials. Indeed, lines 32-36 show that the adsorption capability of pozzolan material compares favorably to K-42 and BAZ-1. As previously stated, K-42 activated carbon and BAZ-1 activated carbon are entirely composed of carbon, i.e., 100% carbon. Pozzolan materials can be composed of some or all of the following components: sodium oxide, magnesium oxide, aluminum oxide, silicon dioxide, phosphorous pentoxide, sulfur trioxide, chlorine, potassium oxide, calcium oxide, titanium dioxide, manganese (II) oxide, and iron (III) oxide. Again, the present inventors have recognized that the silica component of the pozzolan material, which can range from 20-95% of pozzolan material, may provide for the increased absorption capability of pozzolan material when compared to K-42 and BAZ-1.

In view of the foregoing description, it should be understood that the method of diffusing $CO_2$ within a concrete mixture using a $CO_2$ adsorbed aggregate material described herein increase the mechanical strength the hardened concrete products formed from this concrete mixture and sequester an increased amount of $CO_2$ within the hardened concrete material while reducing the production time when compared to previous methods. The method includes mixing a non-recycled aggregate material, such as a pozzolan material, with $CO_2$ gas in a pretreatment chamber, where the $CO_2$ gas is adsorbed by the non-recycled aggregate material. Next, the $CO_2$ adsorbed aggregate material is transferred from the pretreatment chamber into a cement mixing chamber, where it is mixed with cement and water to form a concrete mixture. During the mixing step, $CO_2$ is released by the $CO_2$ adsorbed aggregate material to uniformly carbonate the concrete mixture, causing the above noted improved characteristics of the resultant hardened concrete products.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present inventive technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present inventive technology, it is noted that this term is introduced in the claims as an open-ended transitional phrase that is used to introduce a recitation of a series of characteristics of the structure and should be interpreted in like manner as the more commonly used open-ended preamble term "comprising.

The invention claimed is:
1. A method of diffusing $CO_2$ within a concrete mixture, the method comprising:

mixing a non-recycled aggregate material with a $CO_2$ gas in a pretreatment chamber of a concrete preparation system to form a $CO_2$ adsorbed aggregate material;

transferring the $CO_2$ adsorbed aggregate material from the pretreatment chamber into a cement mixing chamber of the concrete preparation system; and mixing the $CO_2$ adsorbed aggregate material with cement and water to form the concrete mixture, wherein mixing the $CO_2$ adsorbed aggregate material with cement and water releases $CO_2$ from the $CO_2$ adsorbed aggregate material and diffuses $CO_2$ into the concrete mixture to form a carbonated concrete mixture, wherein the carbonated concrete mixture comprises a distribution of carbon that varies by 10% or less throughout the volume of the carbonated concrete mixture.

2. The method of claim 1, wherein the carbonated concrete mixture comprises a distribution of carbon that varies by 5% or less throughout the volume of the carbonated concrete mixture.

3. The method of claim 1, wherein the non-recycled aggregate material comprises a pozzolan material.

4. The method of claim 3, wherein the pozzolan material comprises a peak $CO_2$ adsorption rate of $6.0 \times 10^{-4}$ moles per second or greater.

5. The method of claim 3, wherein the pozzolan material comprises a $CO_2$ adsorption capacity of 0.4 millimoles per gram or greater.

6. The method of claim 3, wherein the pozzolan material comprises a natural pozzolan material.

7. The method of claim 1, wherein the concrete preparation system further comprises a $CO_2$ source coupled to the pretreatment chamber by a $CO_2$ input pipe.

8. The method of claim 7, wherein mixing the non-recycled aggregate material with the $CO_2$ gas in the pretreatment chamber comprises:

directing the non-recycled aggregate material into the pretreatment chamber; and directing the $CO_2$ gas from the $CO_2$ source into the pretreatment chamber.

9. The method of claim 1, wherein the $CO_2$ adsorbed aggregate material is transferred from the pretreatment chamber into the cement mixing chamber through a chamber connection pipe.

10. The method of claim 9, wherein:

the concrete preparation system further comprises a downstream flowmeter coupled to the chamber connection pipe; and the downstream flowmeter is configured to measure the flow rate of $CO_2$ adsorbed aggregate material entering the cement mixing chamber.

11. A method of diffusing $CO_2$ within a concrete mixture, the method comprising:

mixing a non-recycled aggregate material with a $CO_2$ gas in a pretreatment chamber of a concrete preparation system to form a $CO_2$ adsorbed aggregate material;

transferring the $CO_2$ adsorbed aggregate material from the pretreatment chamber into a cement mixing chamber of the concrete preparation system; and mixing the $CO_2$ adsorbed aggregate material with cement and water to form the concrete mixture, wherein mixing the $CO_2$ adsorbed aggregate material with cement and water releases $CO_2$ from the $CO_2$ adsorbed aggregate material and diffuses $CO_2$ into the concrete mixture to form a carbonated concrete mixture, wherein the concrete preparation system further comprises a $CO_2$ source coupled to the pretreatment chamber by a $CO_2$ input pipe and wherein the concrete preparation system further comprises an upstream flowmeter fluidly coupled to the $CO_2$ input pipe and configured to measure the flow rate of $CO_2$ gas entering the pretreatment chamber.

12. A method of diffusing $CO_2$ within a concrete mixture, the method comprising:

mixing a non-recycled aggregate material with a $CO_2$ gas in a pretreatment chamber of a concrete preparation system to form a $CO_2$ adsorbed aggregate material;

transferring the $CO_2$ adsorbed aggregate material from the pretreatment chamber into a cement mixing chamber of the concrete preparation system; and mixing the $CO_2$ adsorbed aggregate material with cement and water to form the concrete mixture, wherein mixing the $CO_2$ adsorbed aggregate material with cement and water releases $CO_2$ from the $CO_2$ adsorbed aggregate material and diffuses $CO_2$ into the concrete mixture to form a carbonated concrete mixture, wherein the concrete preparation system further comprises a $CO_2$ source coupled to the pretreatment chamber by a $CO_2$ input pipe and, wherein the $CO_2$ gas is directed from the $CO_2$ source into the pretreatment chamber at a flow rate of from 300 ml/min to 1400 ml/min.

13. The method of claim 12, wherein mixing the non-recycled aggregate material with the $CO_2$ gas in the pretreatment chamber further comprises agitating the non-recycled aggregate material in the pretreatment chamber.

14. A method of diffusing $CO_2$ within a concrete mixture, the method comprising:

mixing a non-recycled aggregate material with a $CO_2$ gas in a pretreatment chamber of a concrete preparation system to form a $CO_2$ adsorbed aggregate material;

transferring the $CO_2$ adsorbed aggregate material from the pretreatment chamber into a cement mixing chamber of the concrete preparation system; and mixing the $CO_2$ adsorbed aggregate material with cement and water to form the concrete mixture, wherein mixing the $CO_2$ adsorbed aggregate material with cement and water releases $CO_2$ from the $CO_2$ adsorbed aggregate material and diffuses $CO_2$ into the concrete mixture to form a carbonated concrete mixture, wherein:

the concrete preparation system further comprises a cement source coupled to the cement mixing chamber by a cement input pipe and a water source coupled to the cement mixing chamber by a water input pipe; and mixing the $CO_2$ adsorbed aggregate material with the cement and the water in the cement mixing chamber comprises:

directing the cement from the cement source into the cement mixing chamber; and directing the water from the water source into the cement mixing chamber.

15. A method of diffusing $CO_2$ within a concrete mixture, the method comprising:

mixing a non-recycled aggregate material comprising a pozzolan material with a $CO_2$ gas in a pretreatment chamber of a concrete preparation system to form a $CO_2$ adsorbed aggregate material;

transferring the $CO_2$ adsorbed aggregate material from the pretreatment chamber into a cement mixing chamber of the concrete preparation system through a chamber connection pipe; and mixing the $CO_2$ adsorbed aggregate material with cement and water to form the concrete mixture, wherein mixing the $CO_2$ adsorbed aggregate material with cement and water releases $CO_2$ from the $CO_2$ adsorbed aggregate material and diffuses $CO_2$ into the concrete mixture to form a carbonated concrete mixture comprising a distribution of carbon that varies by 10% or less throughout the volume of the carbonated concrete mixture.

16. The method of claim 15, wherein the pozzolan material comprises a $CO_2$ adsorption rate of $6.0 \times 10^{-4}$ moles per second or greater and a $CO_2$ adsorption capacity of 0.4 millimoles per gram or greater.

17. The method of claim 15, wherein the pozzolan material comprises a natural pozzolan material.

18. The method of claim 15, wherein the concrete preparation system further comprises a $CO_2$ source coupled to the pretreatment chamber by a $CO_2$ input pipe and wherein mixing the non-recycled aggregate material with the $CO_2$ gas in the pretreatment chamber comprises:
   directing the non-recycled aggregate material into the pretreatment chamber; and
   directing the $CO_2$ gas from the $CO_2$ source into the pretreatment chamber.

19. The method of claim 15, wherein;
   the concrete preparation system further comprises a cement source coupled to the cement mixing chamber by a cement input pipe and a water source coupled to the cement mixing chamber by a water input pipe; and
   mixing the $CO_2$ adsorbed aggregate material with the cement and the water in the cement mixing chamber comprises:
      directing the cement from the cement source into the cement mixing chamber; and
      directing the water from the water source into the cement mixing chamber.

* * * * *